Figure 1:
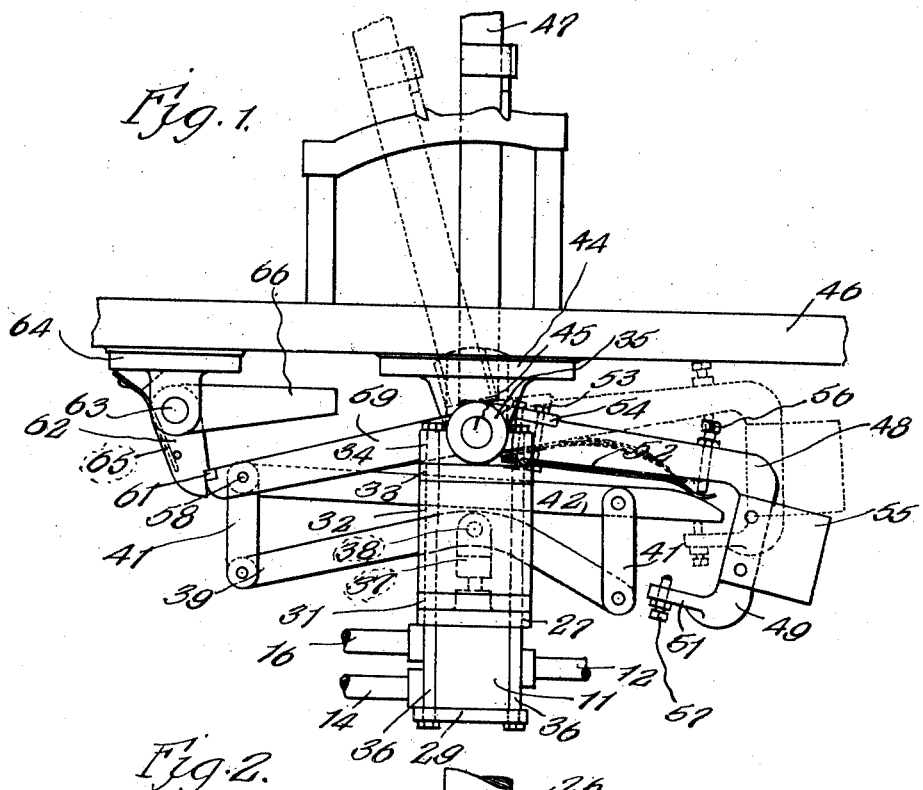

E. B. MEAD.
BRAKE CONTROL.
APPLICATION FILED MAR. 8, 1920.

1,373,196.

Patented Mar. 29, 1921.

Inventor:
Ezra B. Mead
Munday Clarke
By Carpenter Attys

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

BRAKE-CONTROL.

1,373,196.  Specification of Letters Patent.  Patented Mar. 29, 1921.

Application filed March 8, 1920. Serial No. 364,339.

*To all whom it may concern:*

Be it known that I, EZRA B. MEAD, a citizen of the United States, residing at Ottumwa, in the county of Wapello and State of Iowa, have invented a new and useful Improvement in Brake-Controls, of which the following is a specification.

This invention relates in general to brake control mechanism and has more particular reference to mechanisms provided to control the brakes of mine hoists and the like. Hoists of this character are usually controlled by hoist engineers or other attendants located at a control station from which the cage is not visible throughout its travel. An indicator indicates the movement of the cage and shows its approach to a desired landing. The hoist engineer observes the indicator until the cage is almost at the landing then he shifts his attention to the drum which carries a painted spot to indicate accurately the desired position of rest. Braking may be accomplished either by hand actuated control or by a control actuated by power. When the former is used the extent of braking action may be accurately estimated by the amount of force the operator exerts in pulling upon the hand lever. This form of brake control, however, requires the exertion of considerable effort by the operator. The power operated brake controls in use prior to my invention have been so constructed and arranged that accurate operation of the brake at desired force and at desired periods has been difficult to obtain. The position of the brake in many power actuated brake controls has been determined by the position of the control member and since the brake blocks wear and must be reset at intervals the conditions of the braking means are continually changing with the result that the braking forces exerted at the various positions of the control are constantly altered.

Other types of power control in use are still less easily operated with accuracy. For example, there is a type wherein a direct pressure valve is operated and the amount of braking force can only be guessed at from the cable movement. It is substantially impossible to accurately estimate the braking effect in this way since a considerable change of speed is necessary before the effect is apparent. That is to say, if the operator is braking too much he does not notice it until the cage has slowed so greatly that additional power is needed to make the landing.

A principal object of the invention is the provision of a power actuated brake control which will require the operator to exercise a variable amount of effort in the braking action, which effort while materially less than that required in a hand actuated control will in the fashion of said hand actuated control advise the operator at all times, and independently of changing conditions of his brake block, of the extent of his braking action.

The present invention is a modification of the structure described in my co-pending application executed of even date herewith, having Serial Number 364,338.

The present invention contemplates, among other valuable features of novelty, the provision of a construction which will not produce wear on the stem of the controlling valve in the braking action.

A further object of the present invention is the provision of a construction of the character of my co-pending application and fulfilling the before-stated objects, of compact structure and capable of assembly in a single unit and as a result capable of easy installation in the mine hoists of which it is intended that it form a part.

Other objects and advantages of the invention will be apparent as it is better understood from the following description, which taken in connection with the accompanying drawings discloses a preferred embodiment thereof.

Figure 2:
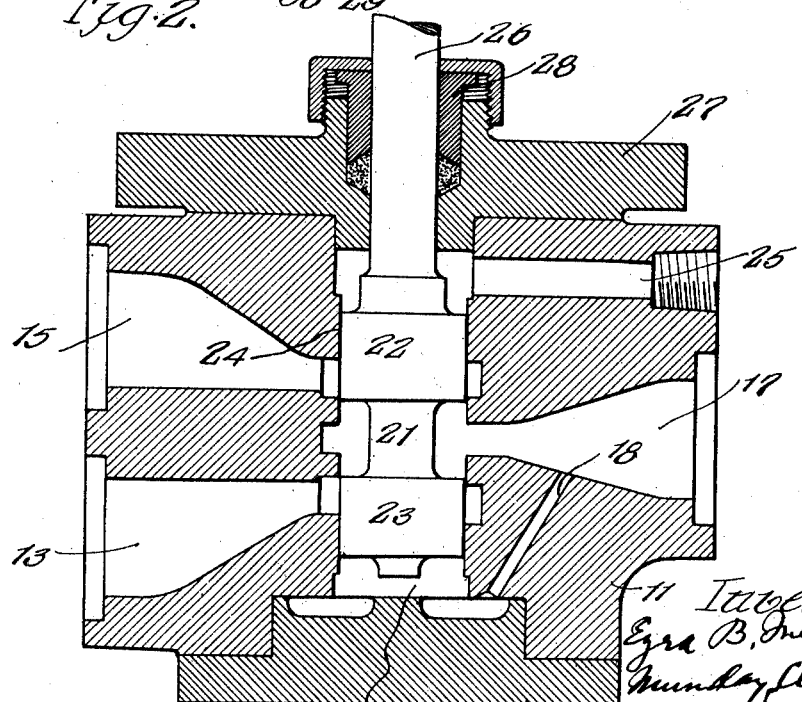

On the drawing,

Figure 1 is a side elevation of an apparatus embodying my present invention; and Fig. 2 is an enlarged detail view through the control valve.

Referring to the drawing reference character 11 indicates a control valve for controlling the delivery of fluid under pressure through a conduit or pipe 12 and the thrust cylinder of the brake (not shown). The valve has an inlet at 13 through a pipe 14 from a suitable source of fluid pressure and an outlet at 15 through a pipe 16 to a sump or other receiving reservoir. The pipe 12 communicates with a third port 17, which port communicates through a by-pass 18 with the space 19 located beneath the valve proper. The valve proper, generally indicated at 21, is provided with an upper operative portion 22 and a lower operative portion 23, sliding in contact with the valve seat valve 24. An exhaust port 25 is provided above the upper valve part to relieve any pressure on the stuffing box and permit any material leaking past the valve to pass out without interfering with the action. The valve has a valve stem or rod 26 passing through the valve head 27 and through a stuffing box 28 surrounding the stem in the upper part of the head.

The valve is mounted in a control casing comprising a lower plate 29, spaced side plates 31, 32 and 33, and spaced top plates 34 having bearings 35 for the main shaft, as will be presently described. Four bolts 36 extend through the plate 29 and through the top plate 27 of the valve and through the side plates 31, 32, 33 and 34 so that the valve and the main shaft are connected in a unit structure.

The valve stem is provided at its upper end with a bifurcated head 37 having an opening 38 for receiving a pivot pin. A curved lever 39 is pivoted within this bifurcated head 37 of the valve stem and its two ends extend downwardly at each side thereof. These ends are connected by links 41 with a floating lever 42 arranged immediately above the lever 39 so that the lever 39, links 41 and lever 42 constitute a parallel motion device permitting upward and downward movement of the valve stem without receiving side thrust. The effective length of the links 41, *i. e.*, the distance between the pivotal connections of the valve and floating lever, equals the distance between the point of connection of the valve lever with the valve stem and the center of the main shaft.

Other bearings for the main shaft (indicated at 45) are provided in bearing brackets 44 and are adapted to be fixed to the underside of a platform 46 on which the brake operator may stand. A hand lever 47 is pivoted on the shaft 45 and this lever extends out beyond the shaft in the form of an arm 48 to beyond the right-hand end of lever 42 and therebeyond extends down as indicated at 49 and in again at 51 parallel with the part 48, the parts 48, 49 and 51 forming a wide channel member within which extends the adjacent end of the lever 42. On the underside of the part 48 is secured a leaf spring 52 held in place by bolts 53 passing through the sides of the spring and through a top plate 54 on the arm. This spring normally tends to lift the arm 48 and is restrained against this lifting tendency by a weight 55 fixed on the part 49 of the arm. An adjusting screw 56 is provided to bear against the end of the spring and limit its compression under the influence of the weight. A set screw 57 is provided in the end of the arm part 51 for adjustable engagement with the underside of the end of the lever 42.

It will be manifest that the pressure in the thrust cylinder is communicated to the underside of the valve member 21 through the by-pass 18 and that this pressure tends to lift the valve and by the same token tends to lift the weight 55, acting through the spring 52 and set screw 56. The weight is sufficient to just overcome the pressure in the cylinder when the valve is centrally located and the full pressure is on the cylinder. If the hand lever now be pulled a little toward the left some of the weight 55 is taken from the spring, consequently a corresponding slight relief from the downward pressure of the outside mechanism is felt by the valve stem. The pressure in the thrust cylinder communicating beneath the valve member then lifts it a corresponding slight amount and slow application of the brakes results. If, however, the lever be moved to lift more of the weight from the spring corresponding greater and more rapid action of the valve member occurs and the weight of braking is therefore directly commensurate with both the movement of the lever and with the degree of pressure exerted in moving it. Experience in manipulation of the valve will soon enable the operator to tell by the amount of pressure he is exerting on the lever the extent of braking action.

The lever 42 is fulcrumed at 58 between a pair of arms 59 pivoted on the shaft 45 and having at their free ends a member 61 for engagement by a stop 62 fast on a shaft 63 supported in brackets 64 from the platform 46. A spring 65 normally presses the latch stop 62 toward the ends of the arms 59 and an arm 66 is fixed on the shaft for operation by any of the usual safety devices.

When any of the safety devices operate, the left-hand end of the lever 39 is freed and it may rise under the action of the pressure in the thrust cylinder with the resultant application of the brakes. The arms 59 constrain the movement of the left-hand end of the lever to an arcuate path about the shaft 45 as a center and the floating lever in this movement, of course, moves somewhat to the side. The effect of the links 41 is to permit the valve stem to rise vertically and without side thrust upon it since by reason of the curve in it the condition is such, so far as lateral movement is concerned, as though it were located at the center of the axis of the shaft leaving the movement consisting of the single vertical component. Resetting can only occur by a movement of the control lever 47 to brake set position to enable the lever 42 to be tilted back for reëngagement under the latch stop 62, and of course any of the safety arrangements shown in my companion application may be employed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A brake control, comprising in combination a fluid pressure valve for delivering fluid under pressure to release the brakes and maintain them in released condition, manual means for operating said valve under force commensurate with the resulting brake applying force, said means including a hand lever and connection between said hand lever and said valve, said hand lever connections and valve being mounted in a unit frame.

2. In a brake control, the combination of a hand lever, bearings supporting said hand lever from a platform, and a control valve supported from said bearings.

3. A brake control, comprising a hand lever, a self acting pressure valve for controlling the rate of brake application, and means for restraining the action of said pressure valve, said means comprising a floating lever and spring connection between said floating lever and said hand lever, said hand lever, floating lever and valve being mounted in a common frame.

4. A brake control, comprising a hand lever, a self acting pressure valve for controlling the rate of brake application, and means for restraining the action of said pressure valve, said means comprising a floating lever and spring connection between said floating lever and said hand lever, said hand lever, floating lever and valve being mounted in a common frame with the axes of the hand lever and the valve stem disposed in the same vertical plane.

5. A brake control, comprising a hand lever, a valve containing a valve member compressed under the pressure of the braking fluid, a lever connected to said valve member, pressure means associated with the hand lever and restraining the valve lever, movement of the hand lever toward brake setting position relieving said valve lever of pressure of said means to permit movement of the valve under fluid pressure at the brake, connection between said valve and hand lever including a parallel motion device for preventing movement of said valve lever producing side thrust on said valve stem.

6. In a brake control, a movable valve member, and a valve casing having a pressure inlet near its bottom, an intermediate operative outlet for permitting fluid under pressure to pass through, a thrust cylinder, a sump outlet near its top, and a by-pass from said thrust cylinder outlet to beneath the movable valve member.

EZRA B. MEAD.